(12) United States Patent
 Maetani

(10) Patent No.: US 9,941,717 B2
(45) Date of Patent: Apr. 10, 2018

(54) BATTERY DEVICE

(71) Applicant: SII Semiconductor Corporation, Chiba-shi, Chiba (JP)

(72) Inventor: Fumihiko Maetani, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 77 days.

(21) Appl. No.: 15/138,301

(22) Filed: Apr. 26, 2016

(65) Prior Publication Data

US 2016/0322840 A1    Nov. 3, 2016

(30) Foreign Application Priority Data

Apr. 30, 2015 (JP) ................. 2015-093262

(51) Int. Cl.
 *H02J 7/00* (2006.01)
(52) U.S. Cl.
 CPC ..... *H02J 7/0031* (2013.01); *H02J 2007/0039* (2013.01)
(58) Field of Classification Search
 CPC .................................................. H02J 7/1423
 USPC ........................................................ 320/126
 See application file for complete search history.

(56) References Cited

U.S. PATENT DOCUMENTS

| 6,504,345 | B2 | | 1/2003 | Sakurai et al. | |
|---|---|---|---|---|---|
| 7,304,454 | B2 | * | 12/2007 | Inui et al. | 320/155 |
| 7,592,815 | B2 | * | 9/2009 | Yano | 324/509 |
| 2005/0134230 | A1 | * | 6/2005 | Sato et al. | 320/136 |
| 2007/0285057 | A1 | * | 12/2007 | Yano | 320/116 |
| 2008/0284375 | A1 | * | 11/2008 | Nagaoka et al. | 320/116 |
| 2014/0035360 | A1 | * | 2/2014 | Butzmann | 307/10.1 |

* cited by examiner

*Primary Examiner* — Yalkew Fantu
(74) *Attorney, Agent, or Firm* — Brinks Gilson & Lione

(57) ABSTRACT

Provided is a battery device having high overcurrent detection current accuracy that suppresses increases in a resistance value of a charge/discharge path and in a manufacturing cost. A first charge/discharge control device is configured to monitor a charge/discharge current with a voltage generated across both ends of a charge/discharge control switch, and a second charge/discharge control device is configured to monitor the charge/discharge current with a voltage generated across both ends of a current sensing resistor. A field effect transistor forming the charge/discharge control switch is selected based on a desired ON resistance value. The charge/discharge control switch of the first charge/discharge control device includes a field effect transistor having the desired ON resistance value, and a charge/discharge control switch of the second charge/discharge control device includes a field effect transistor having an ON resistance value other than the desired ON resistance value.

3 Claims, 3 Drawing Sheets

BATTERY DEVICE

RELATED APPLICATIONS

This application claims priority under 35 U.S.C. § 119 to Japanese Patent Application No. 2015-093262 filed on Apr. 30, 2015, the entire content of which is hereby incorporated by reference.

BACKGROUND OF THE INVENTION

1. Field of the Invention

The present invention relates to a battery device including a charge/discharge control device configured to control the charging and discharging of a secondary battery.

2. Description of the Related Art

A battery device of the related art is illustrated in a circuit diagram of FIG. 3.

The battery device of the related art includes a secondary battery 11, a charge/discharge control device 24, an external positive terminal 25, and an external negative terminal 26. The charge/discharge control device 24 includes a charge/discharge control circuit 14, resistors 12 and 15, a capacitor 13, and an N-channel (Nch) charge/discharge control switch 23. The charge/discharge control circuit 14 includes a positive power supply terminal 18, a negative power supply terminal 19, a discharge control signal output terminal 20, a charge control signal output terminal 21, and an overcurrent detection terminal 22. The Nch charge/discharge control switch 23 includes an Nch discharge control field effect transistor 16, and an Nch charge control field effect transistor 17.

The charge/discharge control circuit 14 is configured to monitor the voltage of the secondary battery 11 with a voltage that is applied between the positive power supply terminal 18 and the negative power supply terminal 19. When the voltage of the secondary battery 11 exceeds an overcharge detection voltage, the charge/discharge control circuit 14 outputs a charge prohibiting signal from the charge control signal output terminal 21 to turn the Nch charge control field effect transistor 17 off, to thereby stop charging. This is called an overcharge detection function. When the battery voltage of the secondary battery 11 drops below an overdischarge detection voltage, the charge/discharge control circuit 14 outputs a discharge stopping signal from the discharge control signal output terminal 20 to turn the Nch discharge control field effect transistor 16 off, to thereby stop discharging. This is called an overdischarge detection function.

The charge/discharge control circuit 14 is also configured to monitor a current flowing through the battery device with the voltage of the overcurrent detection terminal 22. When the voltage of the overcurrent detection terminal 22 exceeds a discharge overcurrent detection voltage, the charge/discharge control circuit 14 outputs a discharge stopping signal from the discharge control signal output terminal 20 to turn the Nch discharge control field effect transistor 16 off, to thereby stop discharging. This is called a discharge overcurrent detection function. When the voltage of the overcurrent detection terminal 22 drops below a charge overcurrent detection voltage, the charge/discharge control circuit 14 outputs a charge prohibiting signal from the charge control signal output terminal 21 to turn the Nch charge control field effect transistor 17 off, to thereby stop charging. This is called a charge overcurrent detection function.

Currently, battery devices that include two charge/discharge control devices are often used as safer battery devices. Providing a battery device with two charge/discharge control devices means that, in the event of a failure of a first charge/discharge control device to operate, a second charge/discharge control device comes into operation, and hence safety of the battery device can be enhanced.

FIG. 4 is a circuit diagram for illustrating a battery device with enhanced safety.

The battery device of FIG. 4 includes a secondary battery 11, two charge/discharge control devices 24, an external positive terminal 25, and an external negative terminal 26. Providing the battery device with the two charge/discharge control devices means that, in the event of a failure of the first charge/discharge control device 24 to operate, the second charge/discharge control device 26 comes into operation, and hence safety of the battery device can be enhanced.

However, when an overcurrent detection function with good detection accuracy is to be realized in the related art as illustrated in FIG. 4, the following problem arises.

The charge/discharge control circuit 14 is configured to monitor a current flowing through the battery device with a voltage between the negative power supply terminal 19 and the overcurrent detection terminal 22. The accuracy of the voltage is determined based on the accuracy of ON resistances of the Nch discharge control field effect transistor 16 and the Nch charge control field effect transistor 17. In general, manufacturing variation of ON resistances of field effect transistors is large. Thus, there is a problem in that it is necessary to make a selection of field effect transistors to use only four field effect transistors having desired ON resistances, and the manufacturing cost is increased as a result.

SUMMARY OF THE INVENTION

In order to solve the problem of the related art, a battery device according to one embodiment of the present invention has the following configuration.

A first charge/discharge control device is configured to monitor a charge/discharge current with a voltage generated across both ends of a charge/discharge control switch, and a second charge/discharge control device is configured to monitor the charge/discharge current with a voltage generated across both ends of a current sensing resistor. A field effect transistor forming the charge/discharge control switch is selected based on a desired ON resistance value. The charge/discharge control switch of the first charge/discharge control device includes a field effect transistor having the desired ON resistance value, and a charge/discharge control switch of the second charge/discharge control device includes a field effect transistor having an ON resistance value other than the desired ON resistance value.

According to the battery device of the present invention, the battery device is provided, including the first charge/discharge control device and the second charge/discharge control device, in which the field effect transistors forming the charge/discharge control switches are selected based on the desired ON resistance value, the field effect transistor having the desired ON resistance value is used for the first charge/discharge control device, and a highly accurate current sensing resistor is used for the second charge/discharge control device. It is therefore possible to improve the detection accuracy of a charge/discharge current. Further, the field effect transistor of the second charge/discharge control device has an ON resistance value other than the desired ON resistance value, and hence an increase in the manufacturing cost can be suppressed.

DETAILED DESCRIPTION OF THE PREFERRED EMBODIMENTS

Figure 1:
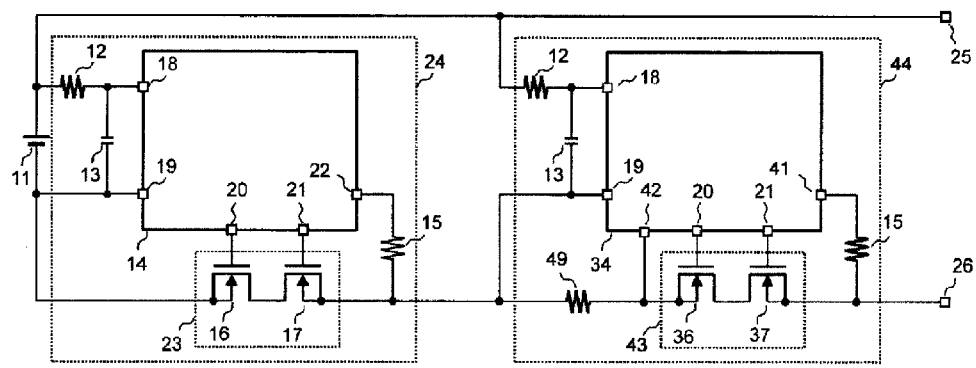
FIG. 1 is a circuit diagram of a battery device according to an embodiment of the present invention.

FIG. 1 is a circuit diagram of a battery device according to an embodiment of the present invention.

The battery device according to this embodiment includes a secondary battery 11, a first charge/discharge control device 24, a second charge/discharge control device 44, an external positive terminal 25, and an external negative terminal 26.

The first charge/discharge control device 24 includes a charge/discharge control circuit 14, a charge/discharge control switch 23, resistors 12 and 15, and a capacitor 13. The charge/discharge control switch 23 includes an Nch discharge control field effect transistor 16, and an Nch charge control field effect transistor 17. The charge/discharge control circuit 14 includes a positive power supply terminal 18, a negative power supply terminal 19, a discharge control signal output terminal 20, a charge control signal output terminal 21, and an overcurrent detection terminal 22.

The second charge/discharge control device 44 includes a charge/discharge control circuit 34, a charge/discharge control switch 43, a current sensing resistor 49, resistors 12 and 15, and a capacitor 13. The charge/discharge control switch 43 includes an Nch discharge control field effect transistor 36, and an Nch charge control field effect transistor 37. The charge/discharge control circuit 34 includes a positive power supply terminal 18, a negative power supply terminal 19, a discharge control signal output terminal 20, a charge control signal output terminal 21, an overcurrent detection terminal 42, and an external electric potential input terminal 41.

In the battery device of this embodiment, the second charge/discharge control device 44, the first charge/discharge control device 24, and the secondary battery 11 are connected in the stated order with respect to the external positive terminal 25 and the external negative terminal 26. Specifically, the external positive terminal 25, a positive electrode of the secondary battery 11, a negative electrode of the secondary battery 11, the charge/discharge control switch 23, the current sensing resistor 49, the charge/discharge control switch 43, and the external negative terminal 26 are connected in the stated order.

Connection in the first charge/discharge control device 24 is made as follows.

The resistor 12 has one terminal connected to the positive electrode of the secondary battery 11, and the other terminal connected to one terminal of the capacitor 13 and to the positive power supply terminal 18 of the charge/discharge control circuit 14. The capacitor 13 has the other terminal connected to the negative electrode of the secondary battery 11 and to the negative power supply terminal 19 of the charge/discharge control circuit 14. The Nch discharge control field effect transistor 16 has a source and a back gate each connected to the negative electrode of the secondary battery 11, a gate connected to the discharge control signal output terminal 20 of the charge/discharge control circuit 14, and a drain connected to a drain of the Nch charge control field effect transistor 17. The Nch charge control field effect transistor 17 has a gate connected to the charge control signal output terminal 21 of the charge/discharge control circuit 14, and a source and a back gate each connected to one terminal of the resistor 15. The resistor 15 has the other terminal connected to the overcurrent detection terminal 22 of the charge/discharge control circuit 14.

Connection in the second charge/discharge control device 44 is made as follows.

The resistor 12 has one terminal connected to the positive electrode of the secondary battery 11, and the other terminal connected to one terminal of the capacitor 13 and to the positive power supply terminal 18 of the charge/discharge control circuit 34. The capacitor 13 has the other terminal connected to the one terminal of the resistor 15 of the first charge/discharge control device 24 and to the negative power supply terminal 19 of the charge/discharge control circuit 34. The current sensing resistor 49 has one terminal connected to the source and the back gate of the Nch charge control field effect transistor 17 of the first charge/discharge control device 24, and the other terminal connected to the overcurrent detection terminal 42. The Nch discharge control field effect transistor 36 has a source and a back gate each connected to the other terminal of the current sensing resistor 49, a gate connected to the discharge control signal output terminal 20 of the charge/discharge control circuit 34, and a drain connected to a drain of the Nch charge control field effect transistor 37. The Nch charge control field effect transistor 37 has a gate connected to the charge control signal output terminal 21 of the charge/discharge control circuit 34, and a source and a back gate each connected to one terminal of the resistor 15. The resistor 15 has the other terminal connected to the external electric potential input terminal 41 of the charge/discharge control circuit 34.

Next, discharge overcurrent detection operation of the battery device of this embodiment is described.

The Nch discharge control field effect transistors 16 and 36 and the Nch charge control field effect transistors 17 and 37 are controlled so as to turn on when the voltage of the secondary battery 11 is equal to or less than an overcharge detection voltage and equal to or more than an overdischarge detection voltage. A discharge current flows through the current sensing resistor 49 when a load is connected between the external positive terminal 25 and the external negative terminal 26 under this state.

The second charge/discharge control device 44 is configured to monitor a voltage generated across both ends of the current sensing resistor 49 with the overcurrent detection terminal 42. When a voltage of the overcurrent detection terminal 42 exceeds a discharge overcurrent detection voltage $V_{42}$, the charge/discharge control circuit 34 outputs a discharge stopping signal from the discharge control signal output terminal 20 to turn the Nch discharge control field effect transistor 36 off, to thereby perform discharge overcurrent protection. Thus, a discharge overcurrent detection current value $I_{DOP41}$ of the second charge/discharge control device 44 is expressed by the following expression where $R_{49}$ represents a resistance value of the current sensing resistor 49.

$$I_{DOP41} = V_{42}/R_{49}$$

Further, the discharge current flows through the charge/discharge control switch 23 of the first charge/discharge control device 24. The first charge/discharge control device 24 is configured to monitor a voltage generated across both ends of the charge/discharge control switch 23 with the overcurrent detection terminal 22. When a voltage of the overcurrent detection terminal 22 exceeds a discharge overcurrent detection voltage $V_{22}$, the charge/discharge control circuit 14 outputs a discharge stopping signal from the discharge control signal output terminal 20 to turn the Nch discharge control field effect transistor 16 off, to thereby perform discharge overcurrent protection. Thus, a discharge overcurrent detection current value $I_{DOP24}$ of the first charge/discharge control device 24 is expressed by the following expression where $R_{23}$ represents an ON resistance value of the charge/discharge control switch 23.

$$I_{DOP24} = V_{22}/R_{23}$$

In this case, the discharge overcurrent detection current value $I_{DOP24}$ depends on the ON resistance value $R_{23}$ of the charge/discharge control switch, and the discharge overcurrent detection current value $I_{DOP41}$ depends on the resistance value $R_{49}$ of the current sensing resistor 49. That is, it is necessary that the ON resistance value of the charge/discharge control switch 23 be accurate to a desired resistance value, but the ON resistance value of the charge/discharge control switch 43 may be inaccurate thereto.

In view of this, the field effect transistors are selected based on the desired resistance value of the ON resistance value. Then, the field effect transistors are classified into two groups of field effect transistors A and B, the field effect transistor A having an ON resistance value close to the desired resistance value, the field effect transistor B having an ON resistance value not close to the desired resistance value. A basis for the classification is set so that the field effect transistors A occupy 50% or more, for example. Then, the field effect transistors A are used at least for the charge/discharge control switch 23, and the field effect transistors B are used for the charge/discharge control switch 43. With this configuration, inaccurate field effect transistors are not disposed of even when a selection is made of the field effect transistors forming the charge/discharge control switches, thereby preventing an increase in the cost due to disposing of transistors through the selection. Further, only one current sensing resistor is added on a charge/discharge path, and hence a resistance value of the charge/discharge path is not increased. In this manner, the battery device of this embodiment can improve discharge overcurrent detection current accuracy. Further, charge overcurrent detection current accuracy can also be improved in a similar manner.

As described above, the battery device of this embodiment includes the first charge/discharge control device configured to detect an overcurrent with the use of the ON resistance of the charge/discharge control switch, and the second charge/discharge control device configured to detect an overcurrent with the use of the current sensing resistor, and hence an overcurrent detection function with good accuracy can be realized while preventing increases in the resistance value of the charge/discharge path, and in the cost due to the selection of the field effect transistors forming the charge/discharge control switches.

Figure 2:
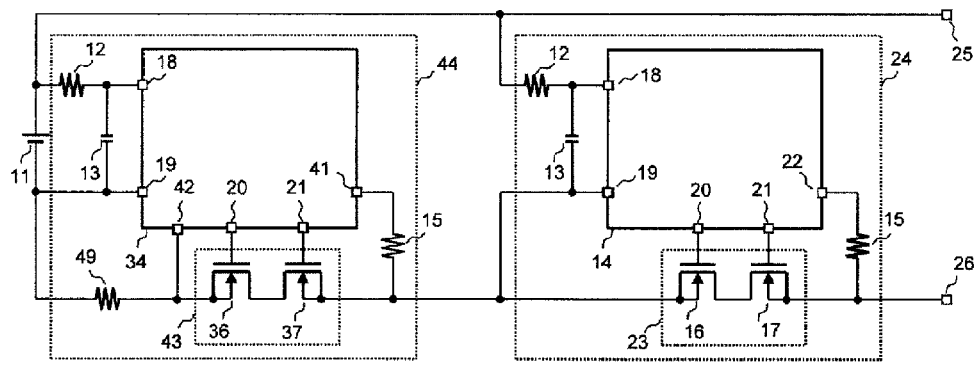
FIG. 2 is a circuit diagram for illustrating another example of the battery device according to the embodiment.
Figure 3:
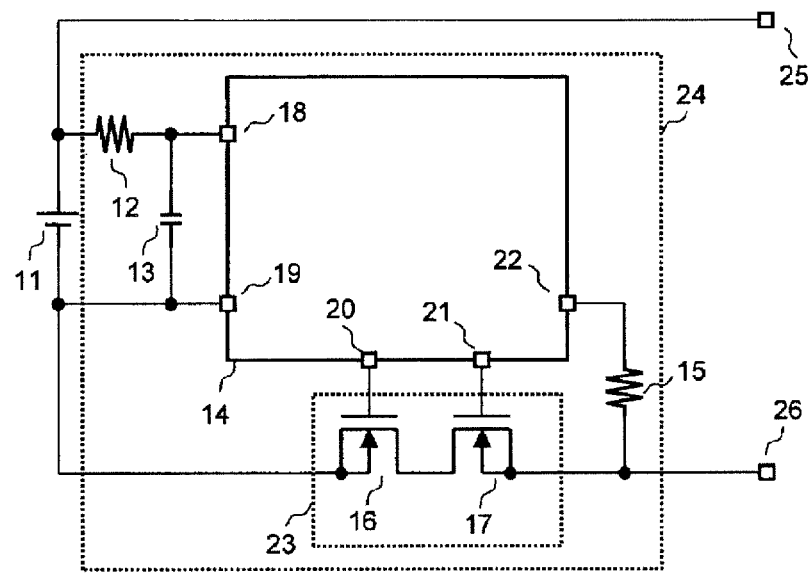
FIG. 3 is a circuit diagram of a battery device using a charge/discharge control device.
Figure 4:
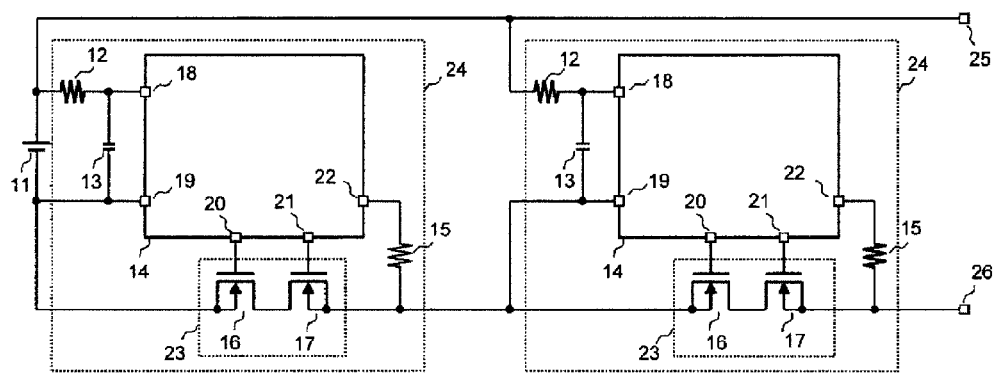
FIG. 4 is a circuit diagram of a related-art battery device with enhanced safety.

FIG. 2 is a circuit diagram for illustrating another example of the battery device according to this embodiment.

The battery device of FIG. 2 differs from the battery device of FIG. 1 in that the connection positions of the first charge/discharge control device 24 and the second charge/discharge control device 44 are switched. The battery device of this embodiment can provide a similar effect also with such a configuration.

It is obvious that the present invention can be applied also for a case in which only a charge/discharge current, only a discharge current, or only a charge current of a battery is controlled.

As described above, according to the battery device of this embodiment, the battery device includes the first charge/discharge control device and the second charge/discharge control device, and increases in the resistance value of the charge/discharge path and in the manufacturing cost are suppressed, thereby providing a battery device having high overcurrent detection current accuracy and enhanced safety.

What is claimed is:

1. A battery device, comprising:
   a secondary battery having positive and negative electrodes;
   positive and negative terminals connected, respectively, to the positive and negative electrodes of the secondary battery;
   a switching line connecting between the positive electrode of the secondary battery and the positive terminal or between the negative electrode of the secondary battery and the negative terminal;
   a first charge/discharge control device and a second charge/discharge control device both connected to the secondary battery in parallel to the second battery between the positive and negative electrodes of the secondary battery, wherein the first charge/discharge control device comprises a first overcurrent detection terminal for monitoring a charge/discharge current flowing through the secondary battery, and the second charge/discharge control device comprises a second overcurrent detection terminal for monitoring the charge/discharge current;
   first and second charge/discharge control switches connected in series in the switching line, wherein the first charge/discharge control switch is turned off by the first charge/discharge control device to cut the switching line, and the second charge/discharge switch is turned off by the second charge/disgorge control device to cut the switching line; and
   a current sensing resistor connected in the switching line upstream of the first charge/discharge control switch, wherein
   the first overcurrent detection terminal of the first charge/discharge control device is connected to the switching line between a downstream end of the current sensing resistor and the first charge/discharge control switch so that the first charge/discharge control device monitors a voltage across the current sensing register to thereby monitor the charge/discharge current flowing through the secondary battery, and
   the second overcurrent detection terminal of the second charge/discharge control device is connected to the switching line downstream of the second charge/discharge control switch so that the second charge/discharge control device monitors a voltage across the second charge/discharge control switch to thereby monitor the charge/discharge current flowing through the secondary battery.

2. A battery device according to claim 1,
   wherein the second charge/discharge control switch includes a second field effect transistor selected to have a second ON resistance value that falls within a small variance from a desired ON resistance, and wherein the first charge/discharge control switch includes a first field effect transistor selected to have a second ON resistance value close to the desired ON resistance value, the first field effect transistor being selected without regard to whether or not the second ON resistance value falls within the small variance from the desired ON resistance.

3. A method for manufacturing a battery device, the battery device comprising:

a secondary battery having positive and negative electrodes;

positive and negative terminals connected, respectively, to the positive and negative electrodes of the secondary battery;

a switching line connecting between the positive electrode of the secondary battery and the positive terminal or between the negative electrode of the secondary battery and the negative terminal;

a first charge/discharge control device and a second charge/discharge control device both connected to the secondary battery in parallel to the second battery between the positive and negative electrodes of the secondary battery, wherein the first charge/discharge control device comprises a first overcurrent detection terminal for monitoring a charge/discharge current flowing through the secondary battery, and the second charge/discharge control device comprises a second overcurrent detection terminal for monitoring the charge/discharge current;

first and second charge/discharge control switches connected in series in the switching line, wherein the first charge/discharge control switch is turned off by the first charge/discharge control device to cut the switching line, and the second charge/discharge switch is turned off by the second charge/disgorge control device to cut the switching line; and a current sensing resistor connected in the switching line upstream of the first charge/discharge control switch, wherein the first overcurrent detection terminal of the first charge/discharge control device is connected to the switching line between a downstream end of the current sensing resistor and the first charge/discharge control switch so that the first charge/discharge control device monitors a voltage across the current sensing register to thereby monitor the charge/discharge current flowing through the secondary battery, and the second overcurrent detection terminal of the second charge/discharge control device is connected to the switching line downstream of the second charge/discharge control switch so that the second charge/discharge control device monitors a voltage across the second charge/discharge control switch to thereby monitor the charge/discharge current flowing through the secondary battery, the method comprising:

constructing the second charge/discharge control switch with a second field effect transistor selected to have a second ON resistance value that falls within a small variance from a desired ON resistance; and constructing the first charge/discharge control switch with a first field effect transistor selected to have a second ON resistance value close to the desired ON resistance value, the first field effect transistor being selected without regard to whether or not the second ON resistance value falls within the small variance from the desired ON resistance.

* * * * *